United States Patent
Chiu

(10) Patent No.: US 9,292,638 B1
(45) Date of Patent: Mar. 22, 2016

(54) METHOD AND APPARATUS FOR PERFORMING TIMING CLOSURE ANALYSIS WHEN PERFORMING REGISTER RETIMING

(71) Applicant: Altera Corporation, San Jose, CA (US)

(72) Inventor: Gordon Raymond Chiu, North York (CA)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/159,858

(22) Filed: Jan. 21, 2014

(51) Int. Cl.
*G06F 17/00* (2006.01)
*G06F 17/50* (2006.01)

(52) U.S. Cl.
CPC .................................. *G06F 17/5031* (2013.01)

(58) Field of Classification Search
CPC ................................. G06F 17/30; G06F 17/50

USPC ........................................................ 716/114
See application file for complete search history.

(56) References Cited

U.S. PATENT DOCUMENTS

| | | | |
|---|---|---|---|
| 2004/0225970 A1* | 11/2004 | Oktem | 716/1 |
| 2007/0074139 A1* | 3/2007 | Oktem | 716/13 |
| 2010/0115477 A1* | 5/2010 | Albrecht et al. | 716/2 |
| 2012/0159414 A1* | 6/2012 | Ghanta et al. | 716/113 |
| 2012/0284680 A1* | 11/2012 | Iyer et al. | 716/113 |
| 2013/0239081 A1* | 9/2013 | Oktem | 716/113 |

* cited by examiner

*Primary Examiner* — Mohammed Alam
(74) *Attorney, Agent, or Firm* — L. Cho

(57) ABSTRACT

A method for designing a system on a target device includes performing register retiming on the system. A critical chain in the system is detected, wherein the critical chain includes a plurality of register-to-register paths and where improving timing on one of the register-to-register paths improves timing on other register-to-register paths. The system is modified in response to properties of the critical chain.

19 Claims, 14 Drawing Sheets

| Name | Pre-RTM | Post-RTM | Slack | Chain Slack |
|---|---|---|---|---|
| FF a[0] (End-Point) | REG | REG (same) | −200 ps | −250 ps |
| RE H6 | | | −200 ps | −250 ps |
| RE V4 | | | −200 ps | −250 ps |
| RE H6 | | | −200 ps | −250 ps |
| LL 42 | | | −200 ps | −250 ps |
| ITERM dataa | | REG (from I[0]) | −250 ps | −250 ps |
| COMB Icell | | | −250 ps | −250 ps |
| FF I[0] | REG | (bypass) | −250 ps | −250 ps |
| LL 42 | | | −250 ps | −250 ps |
| ITERM datab | | | −250 ps | −250 ps |
| COMB Icell | | | −250 ps | −250 ps |
| FF b[0] (End-Point) | REG | REG (same) | −250 ps | −250 ps |

FIG. 7

METHOD AND APPARATUS FOR PERFORMING TIMING CLOSURE ANALYSIS WHEN PERFORMING REGISTER RETIMING

FIELD

Embodiments of the present invention relate to tools for designing systems on target devices. More specifically, embodiments of the present invention relate to a method and apparatus for timing closure analysis when performing register retiming.

BACKGROUND

Target devices such as field programmable gate arrays (FPGAs), structured application specific integrated circuits (ASICs), and ASICs are used to implement large systems that may include million of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow are design generation and integration, synthesis, placement, and routing of the system on the target device.

When addressing conventional timing closure, designers focus on the critical paths in a design. A critical path is a path from a register to another register, through combinational or routing elements, which fails or is close to failing a timing requirement. In an effort to close timing, a designer may examine the critical path and attempt to improve it by reducing an amount of combinational or routing delay along the path.

EDA tools may utilize register retiming algorithms in order to close timing. Register retiming is a synchronous circuit transformation that is used to improve the speed-performance of a synchronous circuit. Register retiming involves moving register across combinational or routing circuit elements in order to reduce the length of timing-critical paths. The combinational structure remains unchanged and the observable behavior of the circuit is identical to the original circuit. When performing register retiming, EDA tools need also address issues such as multiple timing constraints, asynchronous conditions, and architectural constraints.

SUMMARY

Slack borrowing between paths is an attribute of register retiming. The optimization of a circuit by register retiming transforms timing closure from a local problem to a global problem. This necessitates a new level of abstraction beyond the study of critical paths when analyzing timing. The detecting and reporting of critical chains, which include a plurality of register-to-register paths, where improving timing on one of the register-to-register paths improves timing on other register-to-register paths is disclosed. This new abstraction provides a valuable new paradigm for timing closure of highly pipelined or retimed designs.

According to an embodiment of the present invention, a method for designing a system on a target device includes performing register retiming on the system. A critical chain in the system is detected, wherein the critical chain includes a plurality of register-to-register paths and where improving timing on one of the register-to-register paths improves timing on other register-to-register paths. The system is modified in response to properties of the critical chain. According to an aspect of the present invention, detecting the critical chain includes generating a directed graph that includes dependencies between register moves in the system, and deriving the critical chain from a set of infeasible register moves on the directed graph. According to another aspect of the present invention, detecting the critical chain includes identifying register-to-register paths that are related. Constraints on the register-to-register paths are identified. A directed graph which describes the identified register-to-register paths and constraints is generated. An objective function through the graph to detect impermissible register moves is traced.

According to an embodiment of the present invention, a method for designing a system on a target device includes performing register retiming on the system. A critical chain in the system is detected, wherein the critical chain includes a plurality of register-to-register paths and where improving timing on one of the register-to-register paths improves timing on other register-to-register paths. Properties of the critical chain are reported. According to an aspect of the present invention, reporting properties of the critical chain comprises identifying the critical chain and register-to-register paths on the critical chain. According to another aspect of the present invention reporting properties of the critical chain includes identifying a chain slack corresponding to the critical chain and slack along the register-to-register paths on the critical chain.

BRIEF DESCRIPTION OF THE DRAWINGS

The features and advantages of embodiments of the present invention are illustrated by way of example and are not intended to limit the scope of the embodiments of the present invention to the particular embodiments shown.

FIG. 7 illustrates an exemplary critical chain report according to a first embodiment of the present invention.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, procedures, and programs are shown in block diagram form to avoid obscuring embodiments of the present invention unnecessarily.

Target devices such as field programmable gate arrays (FPGAs), structured application specific integrated circuits (ASICs), and ASICs are used to implement large systems that may include millions of gates and megabits of embedded memory. According to an embodiment of the present invention, an electronic design automation (EDA) tool is used to address the complexity of a large system to create and optimize a design for the system onto physical target devices.

Figure 1:
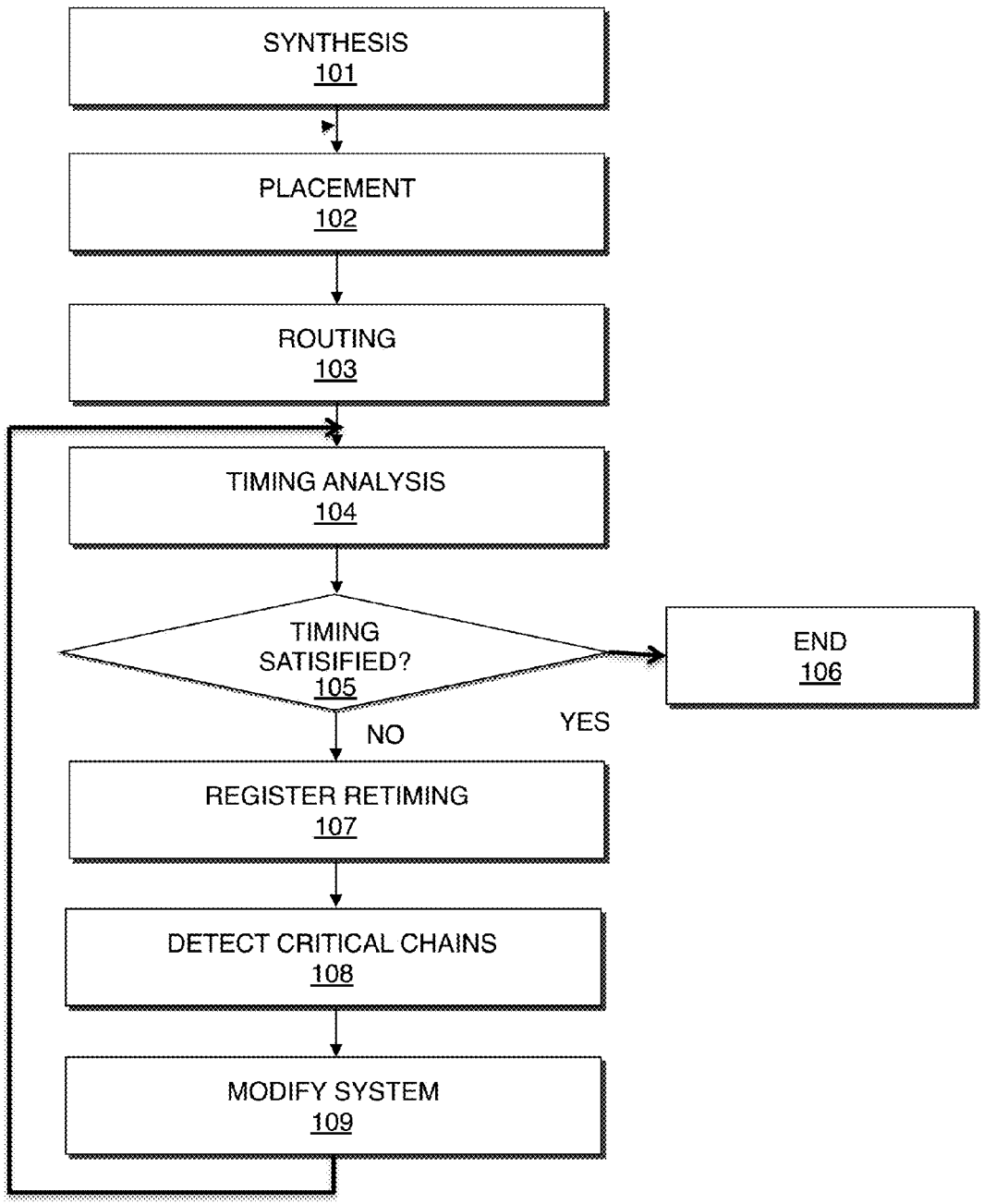
FIG. 1 is a flow chart illustrating a method for designing a system on a target device according to a first exemplary embodiment of the present invention.

FIG. 1 is a flow chart illustrating a method for designing a system on a target device according to a first exemplary embodiment of the present invention. The target device may be a field programmable gate array (FPGA), application specific integrated circuit (ASIC), a structured ASIC, or other programmable device. According to one embodiment, the procedure illustrated in FIG. 1 may be performed by a computer aided design (CAD)/electronic design automation (EDA) tool implemented on a computer system.

At 101, the system is synthesized. Synthesis includes generating a logic design of the system to be implemented by the target device. According to an embodiment of the present invention, synthesis generates an optimized logical representation of the system from an HDL design definition. The optimized logical representation of the system may include a representation that has a minimized number of functional blocks such as logic gates, logic elements, and registers required for the system. Synthesis also includes mapping the optimized logical representation. Mapping includes determining how to implement logic gates and logic elements in the optimized logic representation with the types or categories of resources available on the target device. The resources available on the target device may be referred to as "cells" or "components" and may include logic-array blocks, registers, memories, digital signal processing blocks, input output elements, and other components. According to an embodiment of the present invention, a netlist is generated from mapping. This netlist may be an optimized technology-mapped netlist generated from the HDL.

At 102, the system is placed. According to an embodiment of the present invention, placement involves placing the technology-mapped logical system design on the target device. Placement includes fitting the system on the target device by determining which specific resources on the target device are to be assigned to and implemented by the technology-mapped netlist determined during synthesis. Placement may include clustering which involves grouping logic elements together to form the logic clusters present on the target device.

At 103, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 104, timing analysis is performed on the design of the system generated. According to an embodiment of the present invention, the timing analysis determines whether timing constraints of the system are satisfied. The timing analysis may utilize approximations depending on when it is performed. According to an embodiment of the present invention, timing analysis establishes a length for each path in the system as well as the slack for each path in the system. Slack may be defined to be the amount of delay that can be added to a path before it becomes critical or required time for signal arrival minus actual time of signal arrival.

At 105, if it is determined that the design for the system meets timing constraints, control proceeds to 106. If it is determined that the design for the system does not meet timing constraints, control proceeds to 107.

At 107, register retiming is performed on the system. According to an embodiment of the present invention, register retiming involves moving identified registers across combinational or routing circuit elements to reduce the length of timing-critical or near critical paths as determined by the timing analysis procedure 104.

At 108, critical chains are detected. According to an embodiment of the present invention, the critical chains include a plurality of register-to-register paths, where improving timing on one of the register-to-register paths improves timing on other register-to-register paths. The critical chains allow for the identification of paths that may directly or indirectly impact timing for register-to-register paths that may be timing critical.

At 109, the design for the system is modified. According to an embodiment of the present invention, the design for the system is automatically modified by the EDA tool in response to properties of the critical chains. In one embodiment, the critical chains are ordered according to smallest to largest chain slack, and a design modification is applied to each of the critical chains according to the order. The modifications performed may include removing retiming constraints, adding pipeline delays along a register-to-register path, modifying combinational logic along a register-to-register path, and/or changing one or more synthesis and/or placement assignments.

Timing analysis 104 and register retiming 107 are illustrated in FIG. 1 as being procedures that are performed after routing 103. It should be appreciated that in alternate embodiments of the present invention timing analysis 104 and register retiming 107 may also be performed during or immediately after synthesis 101, placement 102, and/or routing 103. In the alternate embodiments where timing analysis is performed prior to the completion of routing 103, control would continue the design flow instead of terminating it when timing constraints are satisfied. Another timing analysis may be performed at the completion of routing 103 to determine whether to detect critical chains 108 and modify the system 109 or to terminate the design flow 106.

Figure 2:
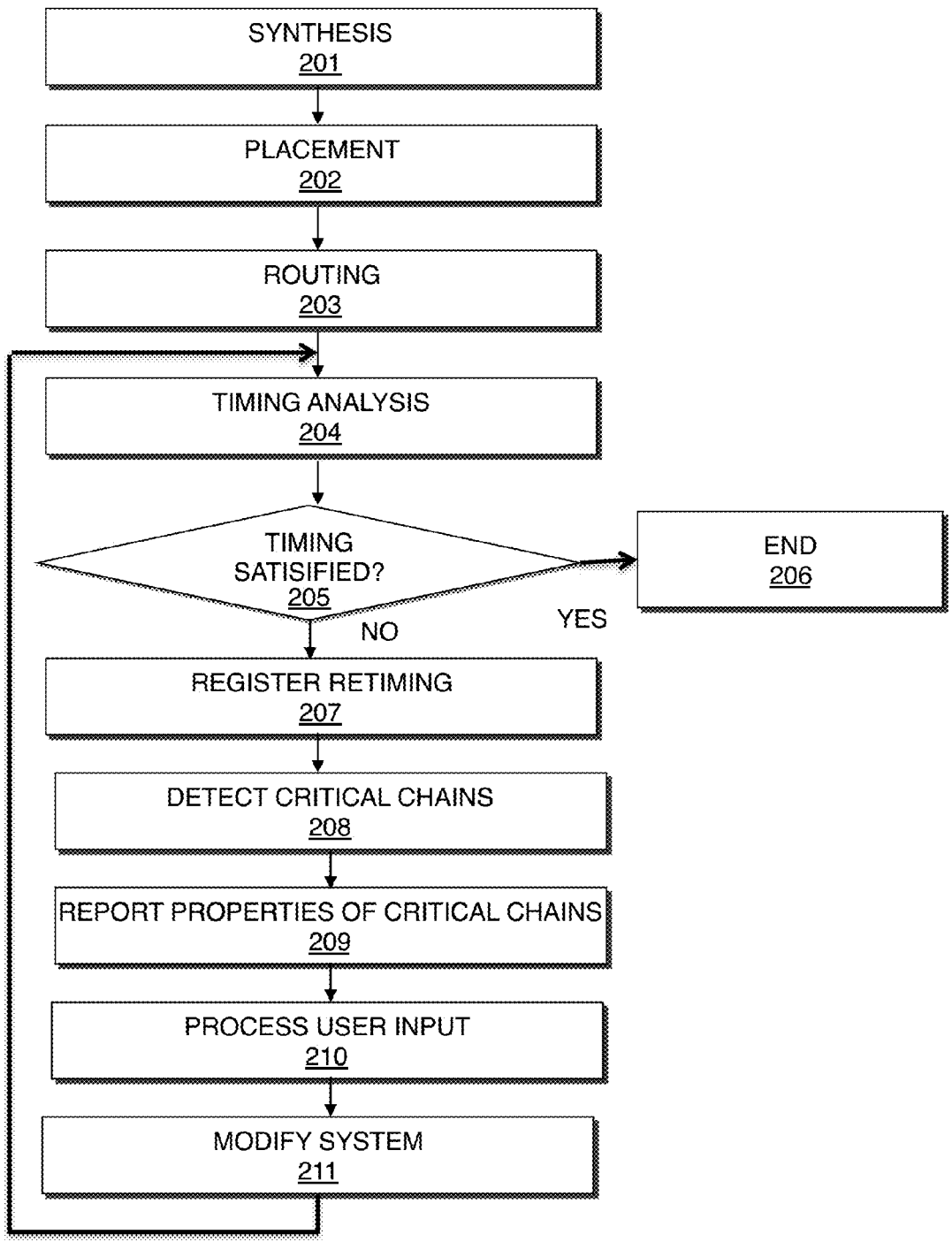
FIG. 2 is a flow chart illustrating a method for designing a system on a target device according to a second exemplary embodiment of the present invention.

FIG. 2 is a flow chart illustrating a method for designing a system on a target device according to a second exemplary embodiment of the present invention. Procedures 201-208 illustrated in FIG. 2 may be performed similarly to procedures 101-108 as described with reference to FIG. 1.

At 209, properties of the critical chains are reported. According to an embodiment of the present invention, the properties of the critical chains may include the identity of a critical chain and register-to-register paths on the chain, chain slack corresponding to the critical chain, locations of potential addition of registers, reasons why a register may not be moved for retiming, states of data at components on the critical chain prior to and after register retiming. In one embodiment, properties of the critical chains may reported on a table or a graph and output to a user on a graphical user interface or data file.

At 210, user inputs are processed to generate a strategy for modifying the design for the system. According to an embodiment of the present invention, the user inputs may include instructions on how modify the design of the system in response to the properties of critical chains reported. The user inputs may require removing retiming constraints, adding pipeline delays along a specific register-to-register path, modifying combinational logic along an identified register-to-register path, and/or changing one or more specified synthesis and/or placement assignments.

At 211, the design for the system is modified. According to an embodiment of the present invention, the design for the system is modified by the EDA tool in response to user inputs received at 210.

As with the design flow illustrated in FIG. 1, timing analysis 204 and register retiming 207 are illustrated in FIG. 2 as being procedures that are performed after routing 203. It should be appreciated that in alternate embodiments of the present invention timing analysis 204 and register retiming 207 may also be performed during or immediately after synthesis 201, placement 202, and/or routing 203. In the alternate embodiments where timing analysis 204 is performed prior to the completion of routing 203, control would continue the design flow instead of terminating it when timing constraints are satisfied. Another timing analysis may be performed at the completion of routing 203 to determine whether to detect critical chains 208, report properties of the critical chains 209, process user input 210, and modify the system 211 or to terminate the design flow 206.

Figure 3:
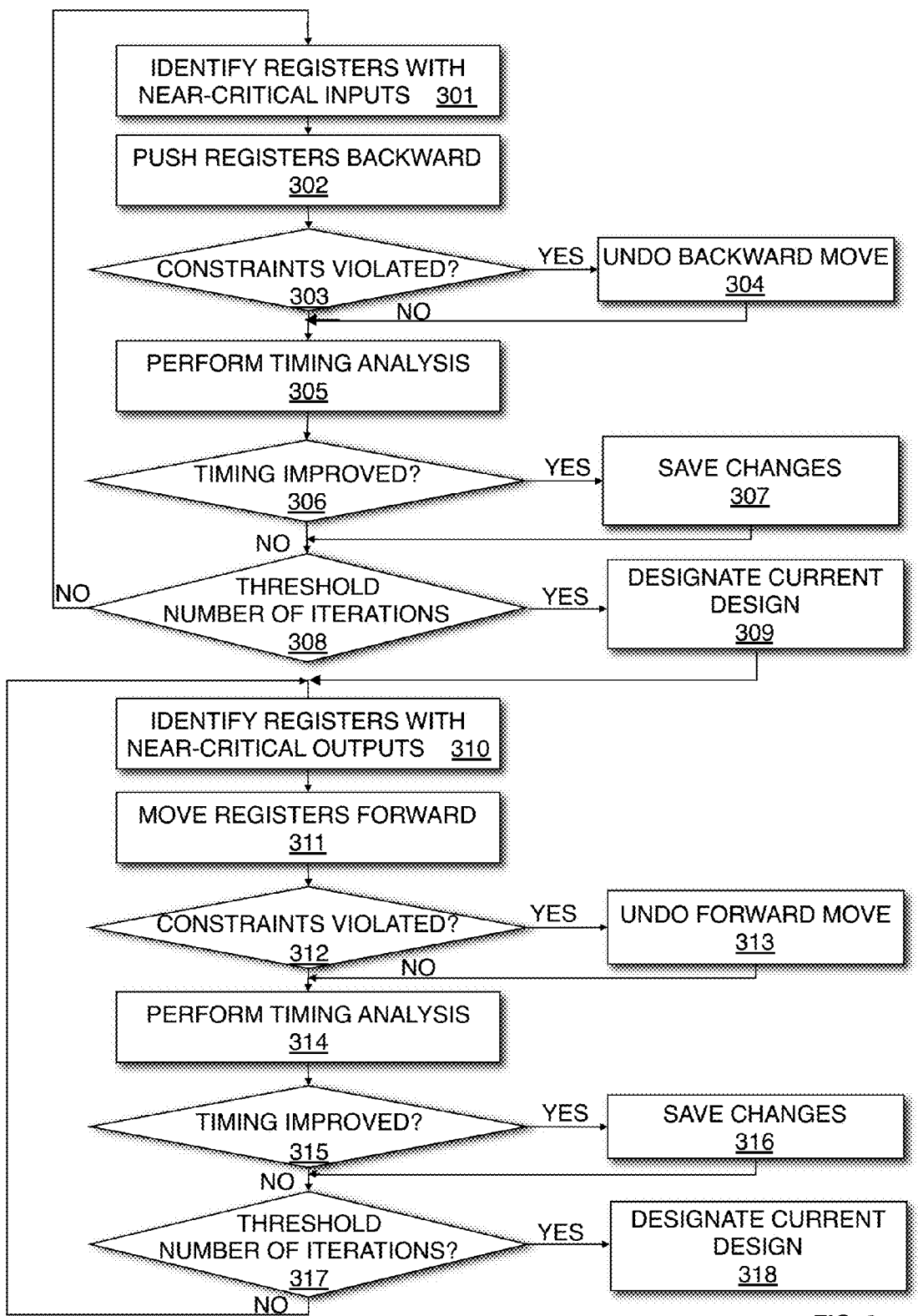
FIG. 3 is a flow chart illustrating a method for performing register retiming according to an exemplary embodiment of the present invention.

FIG. 3 is a flow chart illustrating a method for performing register retiming according to an exemplary embodiment of the present invention. The method shown in FIG. 3 may be used to implement procedures 107 and 207 shown in FIGS. 1 and 2. At 301, registers with inputs connected to near-critical paths are identified. According to an embodiment of the present invention, a near-critical path is a path in the system with a slack value below a threshold value.

At 302, the identified registers at 302 are pushed backwards. According to an embodiment of the present invention, a push backward involves moving the register backwards on the near-critical path to an input of a component. For the backward push to occur, a register needs to be present on each fanout of the component.

At 303, it is determined whether pushing any of the registers backwards at 302 causes a violation of a constraint. According to an embodiment of the present invention, constraints may include user-defined timing constraints. Constraints may include area constraints for the system such as global constraints on the maximum area increase allowed and constraints that ensure that registers are created evenly across the system. Constraints may include architectural constraints that define rules for handling carry chains and various restrictions on secondary signals such as control signals. Constraints may include implicit legality constraints, such as constraints for moving registers feeding asynchronous lines, to ensure that the system functions correctly after retiming is performed. Constraints may include prohibitions to cross time boundaries. Constraints may include user defined constraints such as constraints that prohibit the placement of components on designated sections of the target device. It should be appreciated that other types of constraints may also be defined and included for the purpose of determination of violation at 303. If it is determined that pushing any of the registers backwards causes a violation of a constraint, control proceeds to 304. If it is determined that pushing any of the registers backwards does not cause a violation of a constraint, control proceeds to 305.

At 304, backward pushes that result in violations are undone. Control proceeds to 305.

At 305, timing analysis is performed. Timing analysis establishes the length for each path in the system as well as the slack for each path in the system.

At 306, it is determined whether the timing of the system has improved. Determining whether timing of the system has improved may be achieved by comparing the slack values of near-critical paths in the recently retimed system design with a previous system design. If the timing of the system has improved, control proceeds to 307. If the timing of the system has not improved, control proceeds to 308.

At 307, the current changes to the system are saved. The current changes to the system include the changes made at 302.

At 308, it is determined whether a threshold number of iterations of 301-307 has been performed. If a threshold number of iterations of 301-307 has not been performed, control returns to 301. If a threshold number of iterations of 301-307 has been performed, control proceeds to 309.

At 309, the current changes saved at 307 are designated as the current design for the system.

At 310, registers with outputs coupled to near-critical paths are identified. According to an embodiment of the present invention, a near-critical path is a path in the system with a slack value below a threshold value.

At 311, the identified registers at 310 are pushed forward. According to an embodiment of the present invention, a push forward involves moving the register forward on the near-critical path to an output of a component. For the forward push to occur, a register needs to be present on each input of the component.

At 312 it is determined whether pushing any of the registers forwards at 311 causes a violation of a constraint. The constraints described with reference to 303 may be used at 312. If it is determined that pushing any of the registers forward causes a violation of a constraint, control proceeds to 313. If it is determined that pushing any of the registers forward does not cause a violation of a constraint, control proceeds to 314.

At 313, forward pushes that result in violations are undone. Control proceeds to 314.

At 314, timing analysis is performed. Timing analysis establishes the length for each path in the system as well as the slack for each path in the system.

At 315, it is determined whether the timing of the system has improved. Determining whether timing of the system has improved may be achieved by comparing the slack values of near-critical paths in the recently retimed system design with a previous system design. If the timing of the system has improved, control proceeds to 316. If the timing of the system has not improved, control proceeds to 317.

At 316, the current changes to the system are saved. The current changes to the system include the changes made at 411.

At 317, it is determined whether a threshold number of iterations of 310-316 has been performed. If a threshold number of iterations of 310-316 has not been performed, control returns to 310. If a threshold number of iterations of 310-316 has been performed, control proceeds to 318.

At 318, the current changes saved at 316 are designated as the current design for the system.

FIG. 3 illustrates an embodiment of the present invention where a series of push backwards are performed on identified registers followed by a series of push forwards. It should be appreciated that additional pushes may be performed at a different order. These additional pushes may be made with changes in the definition of near-critical paths. For example, after 316, the threshold value of criticality for determining a near-critical path may be changed and additional push backwards and push forwards may be performed as described with reference to 301-317. It should further be appreciated that the method of register retiming illustrated in FIG. 3 is an exemplary embodiment of the present invention and that other register retiming methodologies and techniques may be used in its place.

Figure 4:
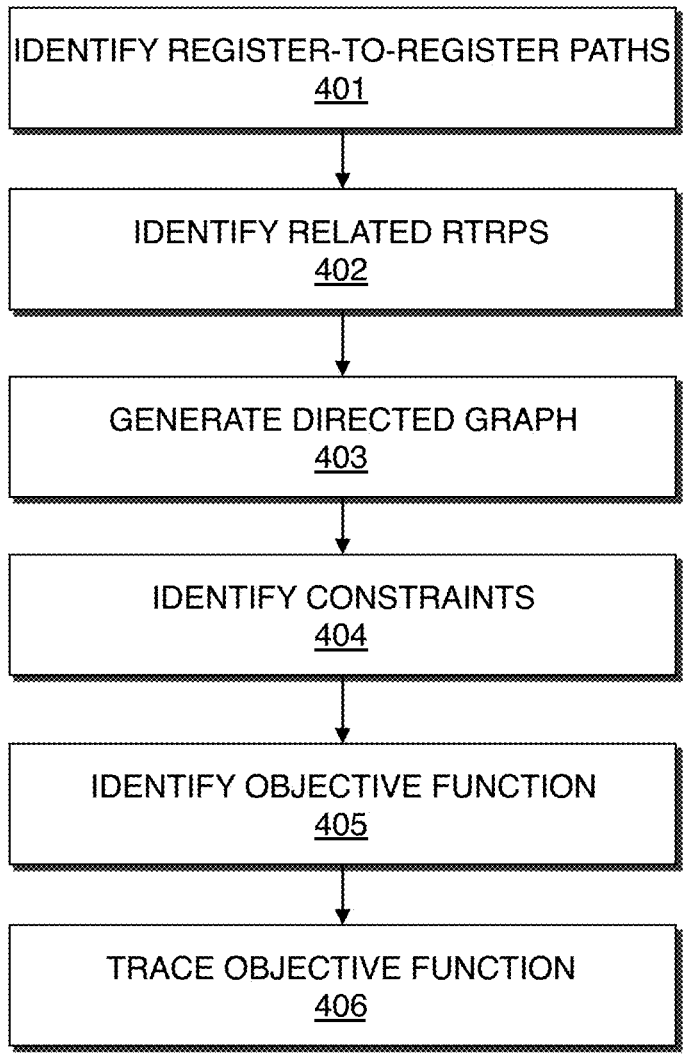
FIG. 4 is a flow chart illustrating a method for performing critical chain detection according to an embodiment of the present invention.

FIG. 4 is a flow chart illustrating a method for performing critical chain detection according to an embodiment of the present invention. The method shown in FIG. 4 may be used to implement procedures 108 and 208 shown in FIGS. 1 and 2. At 401, register-to-register paths are identified. According to an embodiment of the present invention, the worst case slack associated with each of the register-to-register paths are also identified.

At 402, register-to-register paths (RTRPs) that are related are identified. According to an embodiment of the present invention, two register-to-register paths are related if retiming one register-to-register path affects the other register-to-register path. The related register-to-register paths may share a same end point register. Alternatively, due to topology restrictions, latency restrictions, architecture restrictions, or other restrictions, retiming one register may require another register to move.

Figure 5A:
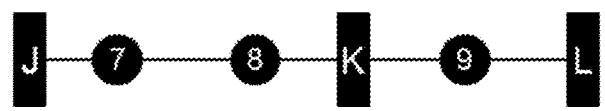
FIGS. 5A and 5B illustrate examples of related path pairs according to an embodiment of the present invention.
Figure 5B:
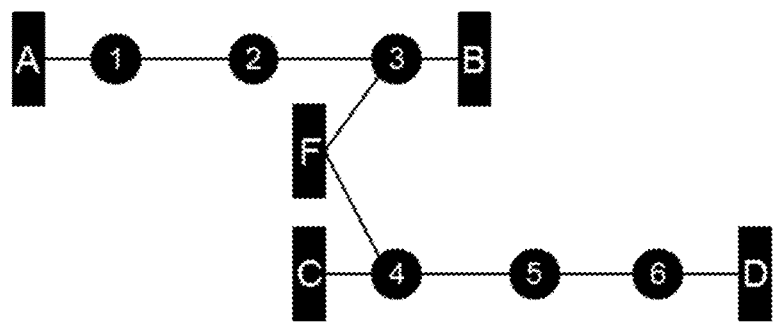

FIGS. 5A and 5B illustrate examples of related path pairs according to an embodiment of the present invention. FIG. 5A illustrates a critical chain that includes registers J, K, and L, and components 7, 8, and 9 which are combinational logic. Paths JK and KL are related as they share a common endpoint at register K. FIG. 5B illustrates a critical chain that includes registers A, B, C, and D, and components 1, 2, 3, 4, 5, and 6. Paths AB and CD are related as retiming register C forward requires moving register F forward. If register F is moved forward, register B is required to move forward.

Referring back to FIG. 4, at 403, a directed graph is generated from the related register-to-register paths. With reference to the examples shown in FIGS. 5A and 5B, the related register-to-register paths may be expressed as follows.

JK:K-forward→KL:K-forward (retiming JK forward requires KL to retime forward)

KL:K-forward→JK:K-forward (retiming KL forward requires JK to retime forward)

CD:C-forward→AB:B-forward (retiming CD forward requires AB to retime forward)

AB:B-forward→CD:C-forward (retiming AB forward requires CD to retime forward)

Referring back to FIG. 4, at 404 constraints among the register-to-register paths are identified. According to an embodiment of the present invention, paths that cannot be retimed without violating timing are represented with a constraint that indicates that retiming one end point needs the other to remove. With reference to FIG. 5A, if AB would not meet timing if we forward pushed B, the following constraint may be expressed.

AB:B-forward→AB:A-forward

According to an embodiment of the present invention, immutable end points may are also represented with constraints. With reference to FIG. 5B, given the conditions that A cannot be retimed and D cannot be retimed, the following constraints may be expressed.

AB:A-forward→FAIL

CD:D-backward→FAIL

Referring back to FIG. 4, at 405, objective functions are identified. Existing register-to-register paths are ordered from smallest conventional slack to largest conventional slack. For each path we generate an objective function which attempts to optimize the path by either moving the first register forward or the second register backward. With reference to FIG. 5B, the objective functions of moving C forward or to move D backward are identified. The objective functions may be expressed as follows.

CD:C-forward OR CD:D-backward

Referring back to FIG. 4, at 406, the objective function is traced through the directed graph. By tracing through the directed graph starting with the objective function, a critical chain may be derived. With reference to FIG. 5B, CD:C-forward implies AB:B-forward, which implies AB:A-forward implies FAIL. CD:D-backward implies FAIL. Therefore, the critical chain is detected to be AB→CD. The chain slack of the chain is equal to the slack of the original register-to-register path from which the objective function is derived. If a register-to-register path is involved in multiple chains, the chain slack equals the worst case value across all chain slacks.

FIGS. 1, 2, and 4 describe procedures where register retiming is performed separately and prior to detecting critical chains. It should be appreciated that in alternate embodiments of the present invention detecting critical chains may be performed prior to register retiming or the two procedures may be performed together concurrently.

According to an embodiment of the present invention, information on related register paths that may be derived while performing a topological traversal during register retiming may be used for critical chain detection. In addition, information regarding constraints or constructs that limit register movement that may be derived during register retiming may also be used for critical chain detection. These constraints or constructs may include a user directive or a synchronizer from a clock crossing.

After critical chains are detected, the design for the system is modified. According to an embodiment of the present invention where a plurality of critical chains are detected on a design for a system, the critical chains are prioritized according to their associated chain slack. Chain slack may be defined as the worst case (most negative) slack of any register-to-register path within a critical chain. The critical chain with the lowest or most negative chain slack is given a highest order and has the highest priority. The critical chain with the highest or most positive chain slack is given a lowest order and has the lowest priority. According to an embodiment of the present invention, critical chains having chain slack greater than a predetermined value may be discarded or removed from the ordering and modification procedure. The procedure of modifying the system may then proceed by modifying the critical chains with the higher priority before modifying the critical chains with lower priority.

According to an embodiment of the present invention, all critical chains are modified at 109/211 prior to returning to timing analysis 104/204. When performing modifications on a critical chain, a plurality of different modification procedure are available. According to an embodiment of the present invention, a single modification procedure is performed on a critical chain during each iteration of procedure 109/211. If timing is not satisfied at 105/205 after previously performing a modification at 109/211, a next modification procedure may be performed during a next modification iteration at 109/211.

According to an alternate embodiment of the present invention, critical chains having a higher priority or a chain slack that exceed a predetermined threshold may have more than a single modification procedure performed on it during a single iteration of procedure 109/211. In other embodiments, the critical chains with higher priority or having chain slack that exceed a predetermined threshold may have additional timing analysis and modification procedures performed on them prior to performing modification on critical chains with lower priority or having chain slack under the predetermined threshold value.

Figure 6:
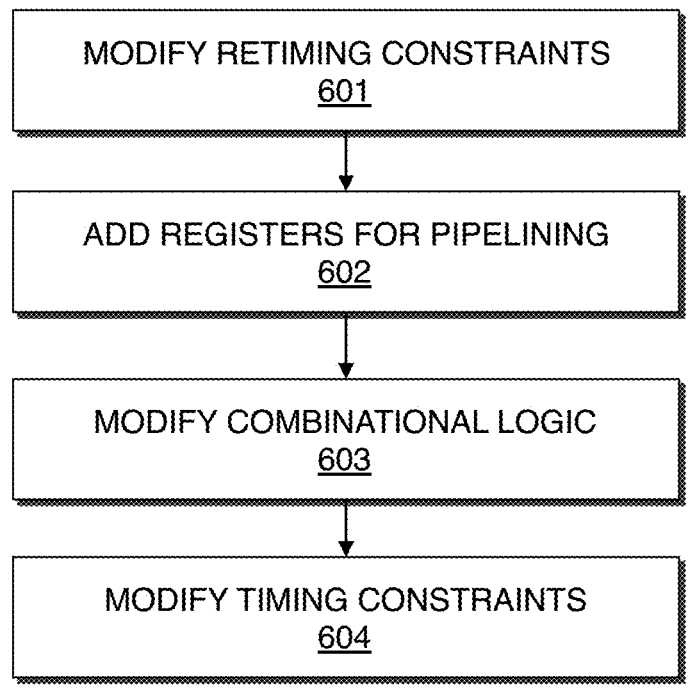
FIG. 6 is a flow chart illustrating a method for modifying a system in response to properties of a critical chain according to an embodiment of the present invention.

FIG. 6 is a flow chart illustrating a method for modifying a system in response to properties of a critical chain according to an embodiment of the present invention. The method shown in FIG. 6 may be used in part or in whole to implement procedures 109 and 211 shown in FIGS. 1 and 2. At 601, register retiming constraints are modified. According to an embodiment of the present invention, actual constraints which prohibit the movement of a register are modified to allow for register retiming. The constraints may be altered or removed completely. Exemplary register retiming constraints may include constraints which restrict retiming across timing domain boundaries, prohibit movement of a specified register, disallow more than a predetermined number of registers to be utilized at a primary input, an incompatibility between the logical register and its physically desired location, and other constraints. According to an embodiment of the present invention, changes may be made to the system design in order to facilitate register timing. For example, for a target device architecture with heterogeneous register locations, with a first location class that supports asynchronous clear resets (ACLRS), and with a second location class that does not support ACLRs, the ACLRs on a critical chain may be converted to synchronous clear resets (SCLRs) to allow for the register to be implemented in both the first and second location classes.

At 602, registers are added along the critical chain to facilitate additional pipeline register stages. According to an embodiment of the present invention, the registers may be added onto register-to-register paths along the critical chain from components on the target device or from the routing fabric of the target device.

At 603, combinational logic along the critical chain are modified. According to an embodiment of the present invention, synthesis and/or placement assignments for the combinational logic may be modified to improve timing and reduce delay along the critical chain.

At 604, timing constraints are modified. According to an embodiment of the present invention, timing constraints of the system may be modified to allow for the design to meet timing closure. The timing constraints that may be modified may include multi-cycle constraints, false path constraints, changing clock constraints, clock relationships, and other constraints.

FIG. 6 illustrates an exemplary order in which different techniques may be applied to a design of a system in order to modify it. It should be appreciated that the techniques may be performed in an order other than that illustrated and that other techniques may also be used in place of or in addition to those described.

Properties of the critical chains of a design may be reported to a user. According to an embodiment of the present invention, the reporting may be performed by outputting properties of the critical chain in textual format in the form of a table. The reporting may also be performed by outputting the properties of the critical chain in a graphical format by in the form of a diagram.

FIG. 7 illustrates an exemplary critical chain report according to a first embodiment of the present invention. The critical chain report is in the form of a table that includes a first column 710 that lists the name of elements on a critical chain. The elements may include registers, routing resources, data terminals, cells, and other components on the critical chain. The critical chain report includes a second column 720 that lists the state of data at each of the elements before register retiming is performed. The critical chain report includes a third column 730 that lists the state of data at each of the elements after register retiming is performed. The critical chain report includes a fourth column 740 that lists the slack from an element to the next register in the critical chain after register retiming has been performed. The critical chain report includes a fifth column 750 that lists the chain slack after register retiming has been performed.

Column 710 lists elements in the critical chain from end point to end point. As shown, flip-flop register a[0] is at a first end point and flip-flop b[0] is at the second end point. Flip-flop a[0] feeds through routing elements (REs) H6, V4, H6, and LAB line (LL) 42 before entering input terminal (ITERM) dataa of combinational logic (lcell). Data is then sent through flip-flop register i[0] which fees through LAB line 42 before entering input terminal datab of combinational logic cell. The data from the combinational logic cell is sent to the flip-flop register b[0].

As shown in FIG. 7, the signals on the critical chain are originally registered at flip-flop registers a[0], i[0], and b[0]. After register retiming, the flip-flop register i[0] is effectively pushed backwards to input terminal dataa. To effectuate the pushing backward of flip-flop register i[0], a new register is implemented on the critical path at the input of terminal dataa, and the flip-flop register i[0] is bypassed on the critical chain. The slack from flip-flop register a[0] to the register at input terminal dataa is −200 ps. The slack from the register at input terminal dataa to flip-flop register b[0] is −250 ps. The chain slack for the critical chain is −250 ps, the worst case slack for the register-to-register path from input terminal dataa to flip-flop register b[0].

Figure 8A:
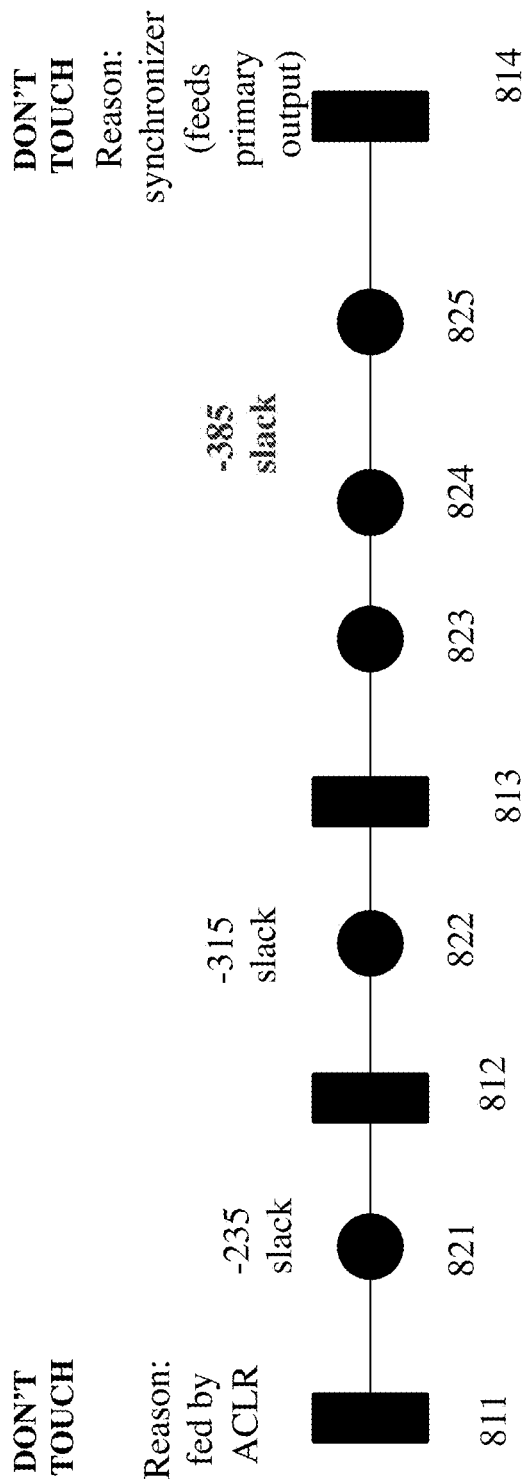
FIGS. 8A and 8B illustrate an exemplary critical chain report according to a second embodiment of the present invention.
Figure 8B:
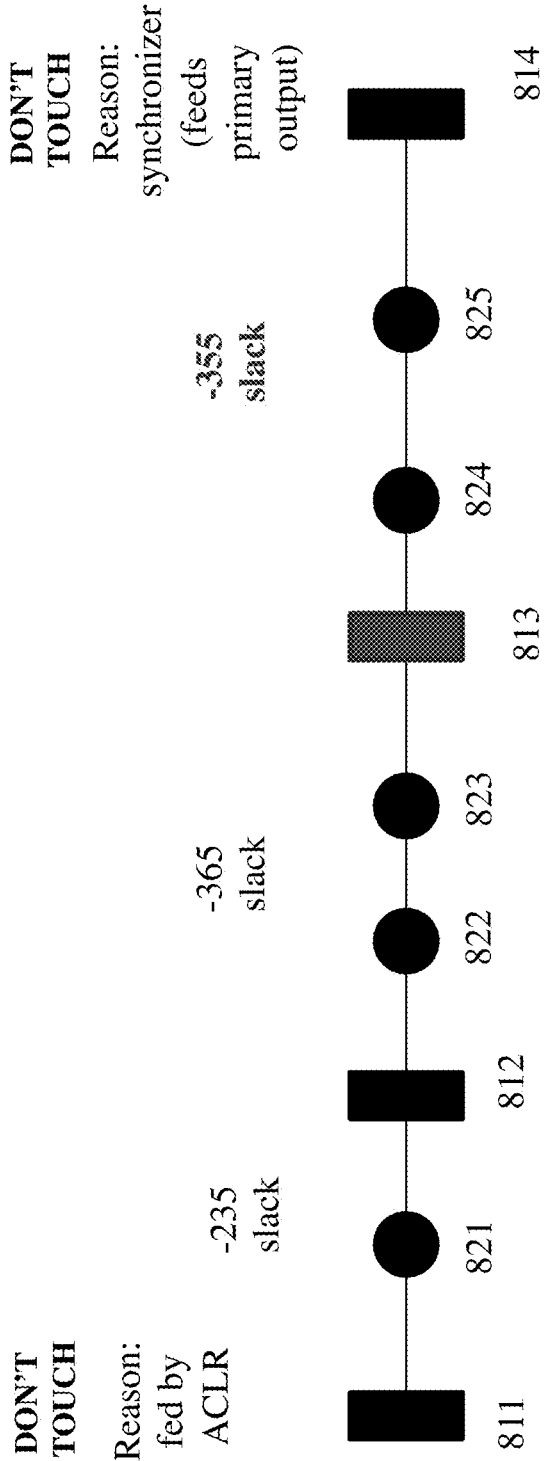

FIGS. 8A and 8B illustrate an exemplary critical chain report according to a second embodiment of the present invention. FIG. 8A illustrates a graphical representation of a critical chain prior to register retiming. Registers on the chain are represented with rectangles and components on the chain are represented with circles. The slack value between registers may be presented on the graphical representation along the path between the registers. Registers that may not be moved may also be highlighted on the graphical representation. Reasons for the constraints on the registers may be also be presented. As illustrated in FIG. 8A, the critical path includes registers 811-814, and components 821-825. Registers 811 may not be moved because it is fed by an ACLR. Register 814 may not be moved because it is a synchronizer that feeds a primary output. Registers 812 and 813, however, have no restrictions on movement, and may be moved during register retiming. The slack between registers 811-812 is −235 slack. The slack between registers 812-813 is −315. The slack between 813-814 is −385. The chain slack is −385 and is presented on the report.

FIG. 8B illustrates a graphical representation of the critical chain shown in FIG. 8A after performing register retiming to reduce the slack between registers 813-814. As shown, register 813 is moved from residing between components 822 and 823 to residing between component 823 and 824. As a result of register retiming, the slack between registers 811-812 is −235 slack. The slack between registers 812-813 is −365. The slack between 813-814 is −355. The chain slack is −365 and is presented on the report.

The graphical representation of the critical chain before register retiming on FIG. 8A is shown separately from the graphical representation of the critical chain after register retiming on FIG. 8B. It should be appreciate, however, that embodiments of the present invention may include a graphical user interface that displays both critical chains on a same window to allow a user to more easily analyze the improvements made with register retiming. Alternatively, the graphical user interface may allow a user to toggle between views of the critical chains. The graphical user interface may also highlight changes made between the critical chains using a number of different techniques such as representing elements which have moved in a different color, size, or shape.

Figure 9A:
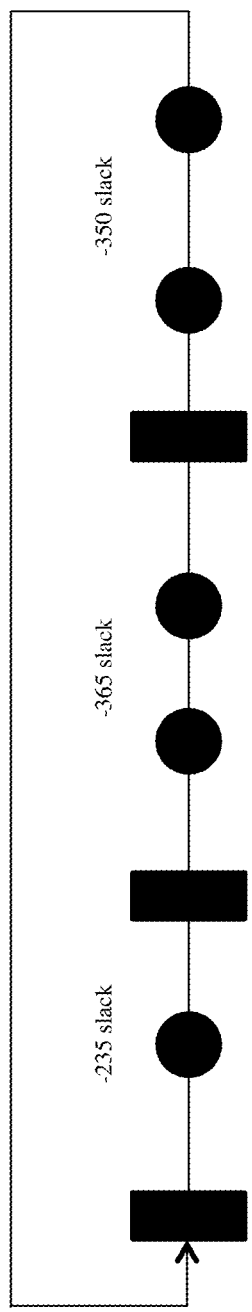
FIGS. 9A and 9B illustrate an exemplary critical chain report according to a third embodiment of the present invention.
Figure 9B:
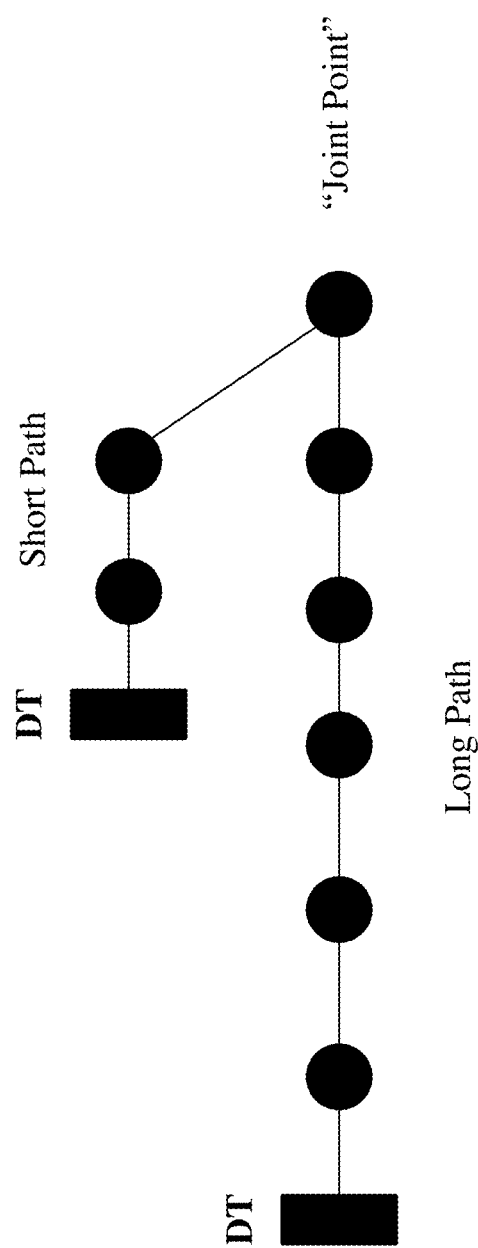

It should be appreciated that a critical chain report may simply provide a graphical representation of a critical chain without all the information described with reference to FIGS. 8A and 8B. FIG. 9A illustrates a critical chain report that provides a graphical representation of a critical chain loop. FIG. 9A illustrates a critical chain report that provides a graphical representation of a critical chain loop and the slack between registers. FIG. 9B illustrates a critical chain report that provides a graphical representation of a critical chain with typology labeling. A first portion of the critical chain that includes long path dependencies that impact set-up is labeled as "Long Path". A second portion of the critical chain that includes short path dependencies that impact hold time is labeled as "Short Path". A location on the critical chain where the first portion and second portion meet is labeled as "Joint Point". Registers that cannot be moved are labeled "DT".

According to an embodiment of the present invention, the procedures illustrated in FIGS. 1-4, and 6 may be performed by an EDA tool executed on a first computer system. A data file may be generated and transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium. By programming the target with the data file, components on the target device are physically transformed to implement the system.

FIGS. 1-4, and 6 are flow charts that illustrate embodiments of the present invention. The procedures described in these figures may be performed by an EDA tool implemented by a computer system. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 10:
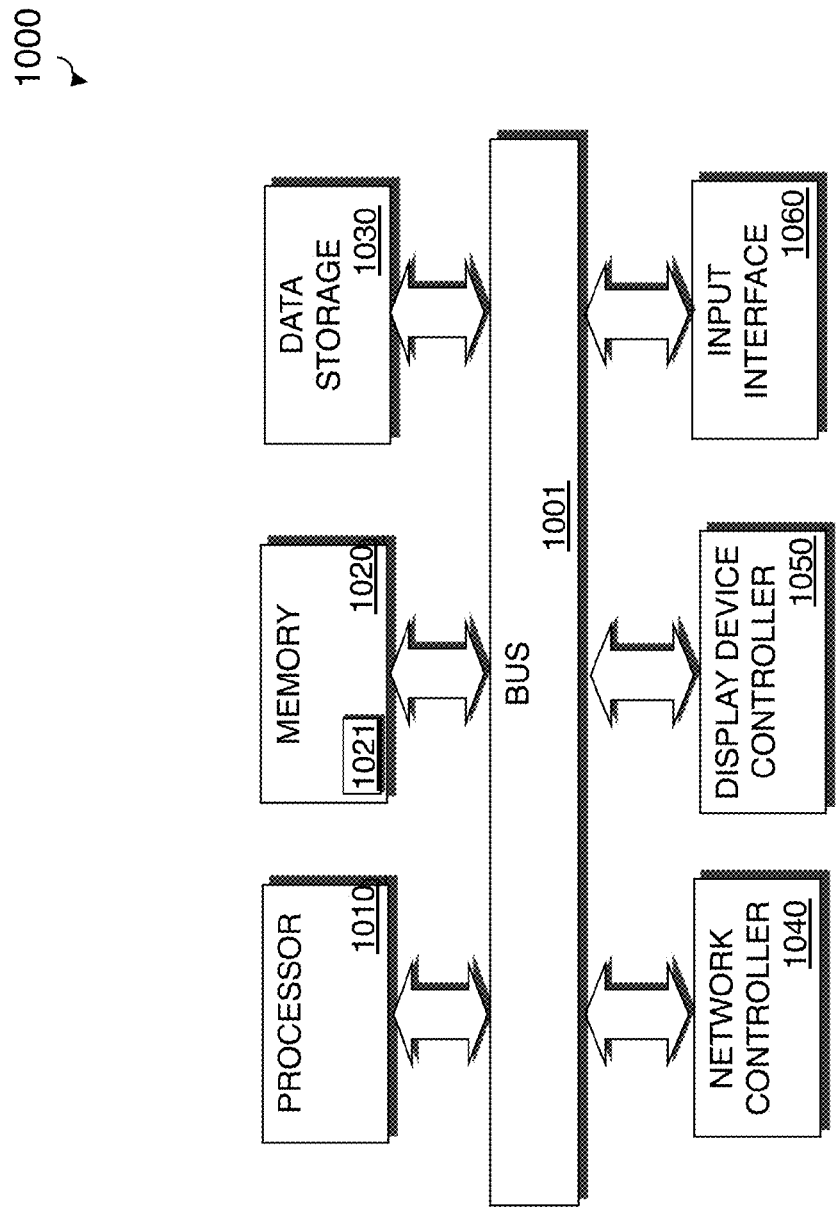
FIG. 10 illustrates a block diagram of a computer system implementing a system designer according to an embodiment of the present invention.

FIG. 10 is a block diagram of an exemplary computer system 1000 in which an example embodiment of the present invention resides. The computer system 1000 includes a processor 1010 that process data signals. The processor 1010 is coupled to a bus 1001 or other switch fabric that transmits data signals between processor 1010 and other components in the computer system 1000. The computer system 1000 includes a memory 1020. The memory 1020 may store instructions and code represented by data signals that may be executed by the processor 1010. A data storage device 1030 is also coupled to the bus 1001

A network controller 1040 is coupled to the bus 1001. The network controller 1040 may link the computer system 1000 to a network of computers (not shown) and supports communication among the machines. A display device controller 1050 is coupled to the bus 1001. The display device controller 1050 allows coupling of a display device (not shown) to the computer system 1000 and acts as an interface between the display device and the computer system 1000. An input interface 1060 is coupled to the bus 1001. The input interface 1060 allows coupling of an input device (not shown) to the computer system 1000 and transmits data signals from the input device to the computer system 1000.

A system designer 1021 may reside in the memory 1020 and be executed by the processor 1010. According to an embodiment of the present invention, the system designer 1121 is operable to perform register retiming on a design of the system. The system designer 1021 is also operable to identify a critical chain in the system, wherein the critical chain includes a plurality of register-to-register paths and where improving timing on one of the register-to-register paths improves timing on other register-to-register paths. According to an embodiment of the present invention, the system designer 1021 supports a graphical user interface operable to report properties of the critical chain. The system designer 1021 is also operable to determine how to modify the system in response to properties of the critical chain.

Figure 11:
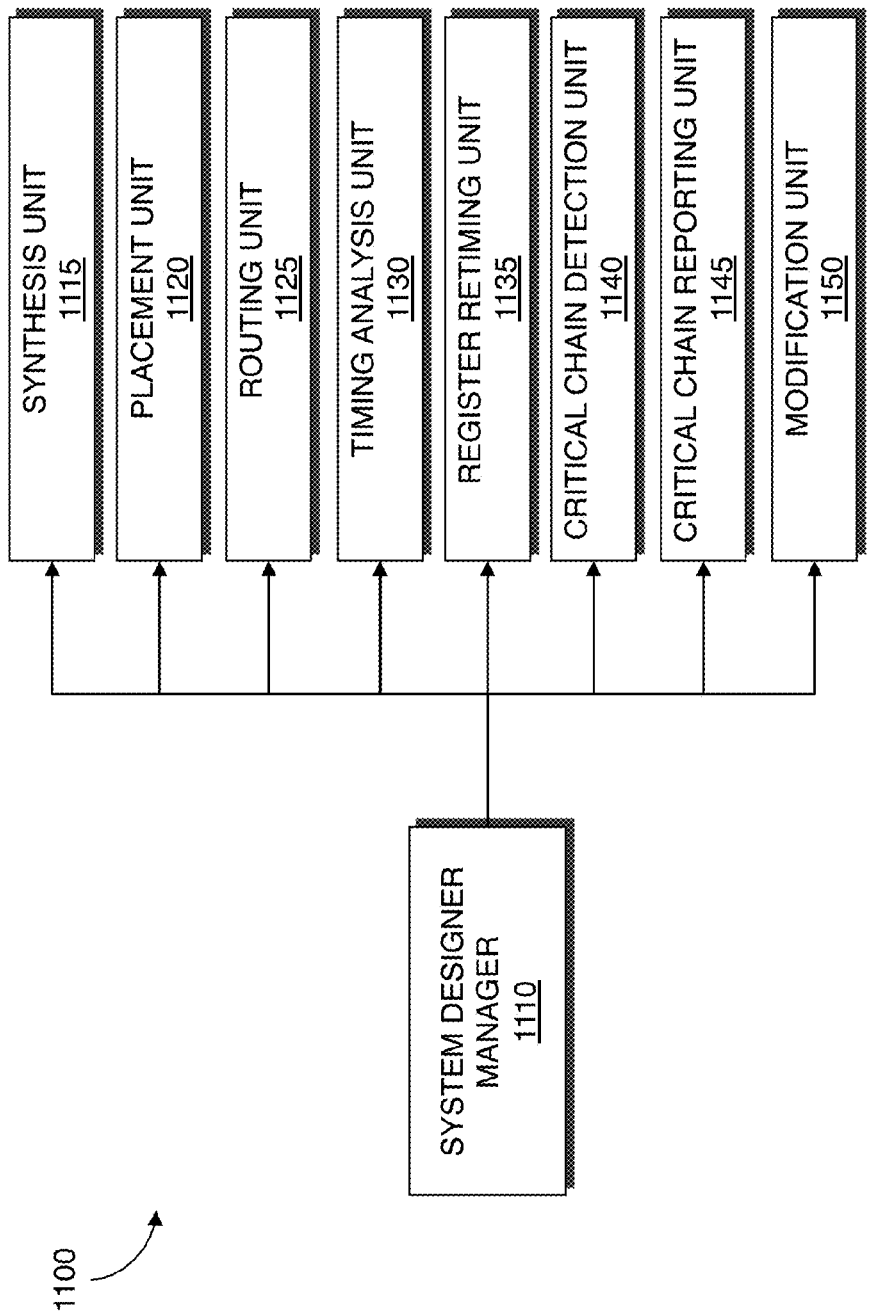
FIG. 11 is a block diagram of a system designer according to an embodiment of the present invention.

FIG. 11 illustrates a system designer 1100 according to an embodiment of the present invention. The system designer 1100 may be an EDA tool for designing a system on a target device such as an FPGA, ASIC, structured ASIC, or other circuitry. FIG. 11 illustrates modules implementing an embodiment of the system designer 1100. According to one embodiment, the modules represent software modules and system design may be performed by a computer system such as the one illustrated in FIG. 11 executing sequences of instructions represented by the modules shown in FIG. 11. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software.

The system designer 1100 includes a designer manager 1110. The system designer manager 1110 is connected to and transmits data between the other components of the system designer 1100. The system designer manager 1110 provides an interface that allows a user to input data into the system designer 1100 and that allows the system designer 1100 to output data to the user.

The system designer 1100 includes a synthesis unit 1115. The synthesis unit 1115 generates a logic design of the system to be implemented by the target device. According to an embodiment of the present invention, the synthesis unit 1115 generates an optimized logical representation of the system from the HDL design definition and maps the optimized logic design. According to an embodiment of the present invention, a netlist is generated from mapping. This netlist may be an optimized technology-mapped netlist generated from the HDL.

The system designer 1100 includes a placement unit 1120. According to an embodiment of the present invention, the placement unit 1120 places the mapped logical system design on the target device. Placement works on the technology-mapped netlist to produce a placement for each of the functional blocks. According to an embodiment of the present invention, placement unit 1120 fits the system on the target device by determining which resources on the logic design are to be used for specific logic elements, and other function blocks determined to implement the system as determined during synthesis. Placement may include clustering which involves grouping logic elements together to form the logic clusters present on the target device.

The system designer 1100 includes a routing unit 1125 which routes the placed design on the target device. The routing unit 1125 allocates routing resources on the target device to provide interconnections between logic gates, logic elements, and other components on the target device. The routing unit 1125 may also perform routability optimization on the placed logic design.

The system designer 1100 includes a timing analysis unit 1130 which performs timing analysis on the design of the system generated. According to an embodiment of the present invention, the timing analysis determines whether timing constraints of the system are satisfied. The timing analysis may utilize approximations depending on when it is performed.

The system designer 1100 includes a register retiming unit 1135. According to an embodiment of the present invention, the register retiming unit 1135 moves identified registers across combinational circuit elements to reduce the length of timing-critical or near critical paths as determined by the timing analysis unit 1130. The register retiming unit 1135 may perform the procedures illustrated in FIG. 3.

They system designer 1100 includes a critical chain detection unit 1140. According to an embodiment of the present invention, the critical chain detection unit 1140 detects a critical chain that includes a plurality of register-to-register paths, where improving timing on one of the register-to-register paths improves timing on other register-to-register paths. The critical chains allow for the identification of paths that may directly or indirectly impact timing for register-to-register paths that may be timing critical. The critical chain detection unit 1140 may perform the procedures illustrated in FIG. 4.

The system designer 1100 includes a critical chain reporting unit 1145. The critical chain reporting unit 1145 reports properties of the critical chain to a user. According to an embodiment of the present invention, the properties of the critical chains may include the identity of a critical chain and register-to-register paths on the chain, chain slack corresponding to the critical chain, locations of potential addition of registers, reasons why a register may not be moved for retiming, states of data at components on the critical chain prior to and after register retiming. Properties of the critical chains may reported on a table or a graph and output to a user on a graphical user interface or data file.

The system designer 1100 includes a modification unit 1150. According to an embodiment of the present invention, the design for the system is automatically modified by the EDA tool in response to properties of the critical chains. According to an alternate embodiment of the present invention, the design for the system is modified in response to input received from a user. The modifications performed may include removing retiming constraints, adding one or more pipeline stages on a critical chain, modifying combinational logic along a critical chain, and/or changing one or more synthesis and/or placement assignments as described with reference to FIG. 6.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 12:
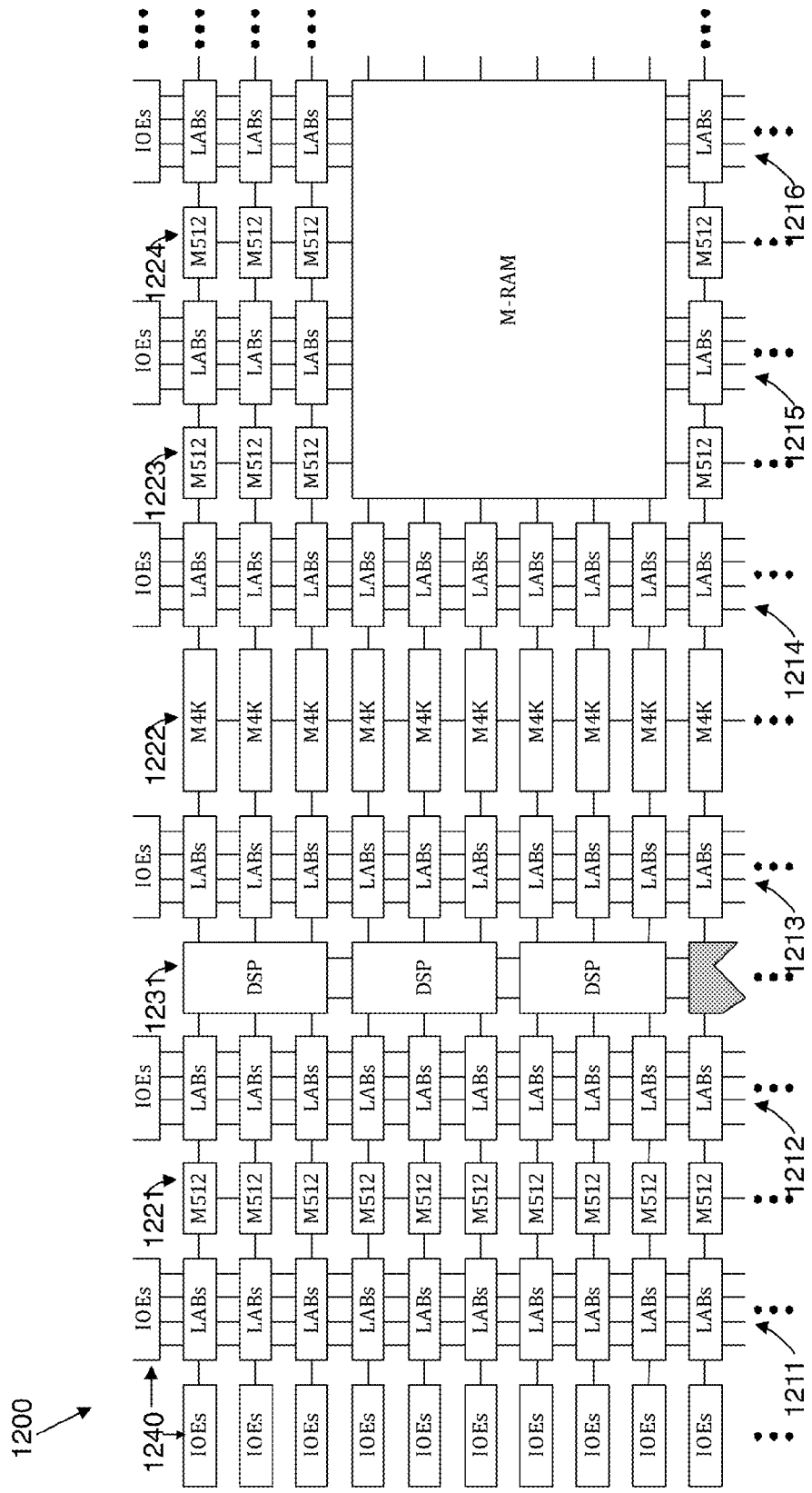
FIG. 12 illustrates an exemplary target device operable to be programmed with a compression/decompression unit according to an embodiment of the present invention.

FIG. 12 illustrates a device 1200 that may be used to implement a target device according to an embodiment of the present invention. The device 1200 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 1200. Columns of LABs are shown as 1211-1216. It should be appreciated that the logic block may include additional or alternate components.

The device 1200 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1200. Columns of memory blocks are shown as 1221-1224.

The device 1200 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1200 and are shown as 1231.

The device 1200 includes a plurality of input/output elements (IOEs) 1240. Each IOE feeds an IO pin (not shown) on the device 1200. The IOEs 1240 are located at the end of LAB rows and columns around the periphery of the device 1200. Each IOE may include a bidirectional IO buffer and a plurality of registers for registering input, output, and output-enable signals.

The device 1200 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for designing a system on a target device, comprising:
performing register retiming on the system;
detecting a critical chain in the system in response to the register retiming, wherein the critical chain includes a plurality of register-to-register paths and where improving timing on one of the register-to-register paths improves timing on other register-to-register paths; and
modifying the system in response to properties of the critical chain, wherein the modifying includes removing register retiming constraints that prohibit movement of a register for register retiming, and wherein at least one of the performing, detecting, and modifying is performed by a processor.

2. The method of claim 1, wherein detecting the critical chain comprises:
generating a directed graph that includes dependencies between registers in the system, and
deriving the critical chain from impermissible register moves on the directed graph.

3. The method of claim 1, wherein detecting the critical chain comprises:
identifying register-to-register paths that are related;
identifying constraints on the register-to-register paths;
generating a directed graph which describes the identified register-to-register paths and constraints; and
tracing an objective function through the graph to detect impermissible register moves.

4. The method of claim 3, wherein identifying register-to-register paths that are related comprises identifying a register-to-register path that is affected by a retiming of another register-to-register path.

5. The method of claim 1, wherein modifying the system in response to properties of the critical chain comprises modifying combinational logic along a register-to-register path.

6. The method of claim 1, wherein modifying the system in response to properties of the critical chain comprises adding one or more pipeline stages along the critical chain.

7. The method of claim 1, wherein modifying the system in response to properties of the critical chain comprises modifying one or more of synthesis and placement assignments.

8. The method of claim 1 further comprising reporting properties of the critical chain.

9. A non-transitory computer readable medium including a sequence of instructions stored thereon for causing a computer to execute a method comprising:
performing register retiming on the system;
detecting critical chains in the system in response to the register retiming, wherein each critical chain includes a plurality of register-to-register paths and where improving timing on one of the register-to-register paths improves timing on other register-to-register paths; and
modifying the system in response to properties of the critical chains by modifying combinational logic along a register-to-register path, wherein the combinational logic excludes registers.

10. The non-transitory computer readable medium of claim 9, wherein detecting the critical chains comprises:
generating a directed graph that includes dependencies between registers in the system, and
deriving a critical chain from impermissible register moves on the directed graph.

11. The non-transitory computer readable medium of claim 9, wherein detecting the critical chains comprises:
identifying register-to-register paths that are related;
identifying constraints on the register-to-register paths;
generating a directed graph which describes the identified register-to-register paths and constraints; and
tracing an objective function through the graph to detect impermissible register moves.

12. The non-transitory computer readable medium of claim 9, wherein modifying the system in response to properties of the critical chains comprises:
ordering the critical chains according to smallest to largest chain slack; and
applying an optimization to each of the critical chains according to the order.

13. The non-transitory computer readable medium of claim 9, wherein chain slack is a worst case slack of an element in a critical chain.

14. The non-transitory computer readable medium of claim 9, wherein modifying the system in response to properties of the critical chains comprises:
removing retiming constraints associated with a critical chain and performing register retiming;
adding one or more pipeline stages along the critical chain if further modification is needed; and
modifying combinational logic along the critical chain if further modification is needed after adding the one or more pipeline stages.

15. The non-transitory computer readable medium of claim 9 further comprising reporting properties of the critical chains.

16. The non-transitory computer readable medium of claim 9, wherein performing register retiming on the system comprises moving a register from one path to an adjacent path in order to shift slack between the one path and the adjacent path.

17. A system designer, comprising:
a register retiming unit that performs register retiming on the system; and
a critical chain detection unit that identifies a critical chain in the system in response to the register retiming, wherein the critical chain includes a plurality of register-to-register paths and where improving timing on one of the register-to-register paths improves timing on other register-to-register paths, wherein the critical chain detection unit generates a directed graph that includes dependencies between registers in the system, and derives the critical chain from impermissible register moves on the directed graph, and wherein at least one of the register retiming unit and the critical chain detection unit is implemented in hardware.

18. The system designer of claim 17, further comprising a system modification unit operable to determine how to modify the system in response to properties of the critical chain.

19. The method of claim 5, wherein modifying the combinational logic comprises modifying synthesis assignments for the combinational logic.

* * * * *